3,484,501
OPERATION OF REACTOR SYSTEMS
John Winsor, Farnborough, and John Carruthers, Chertsey, England, assignors to The British Petroleum Company Limited, London, England, a corporation of England
Filed Oct. 3, 1966, Ser. No. 583,656
Claims priority, application Great Britain, Oct. 4, 1965, 41,939/65
Int. Cl. C07c 7/00
U.S. Cl. 260—674                    13 Claims

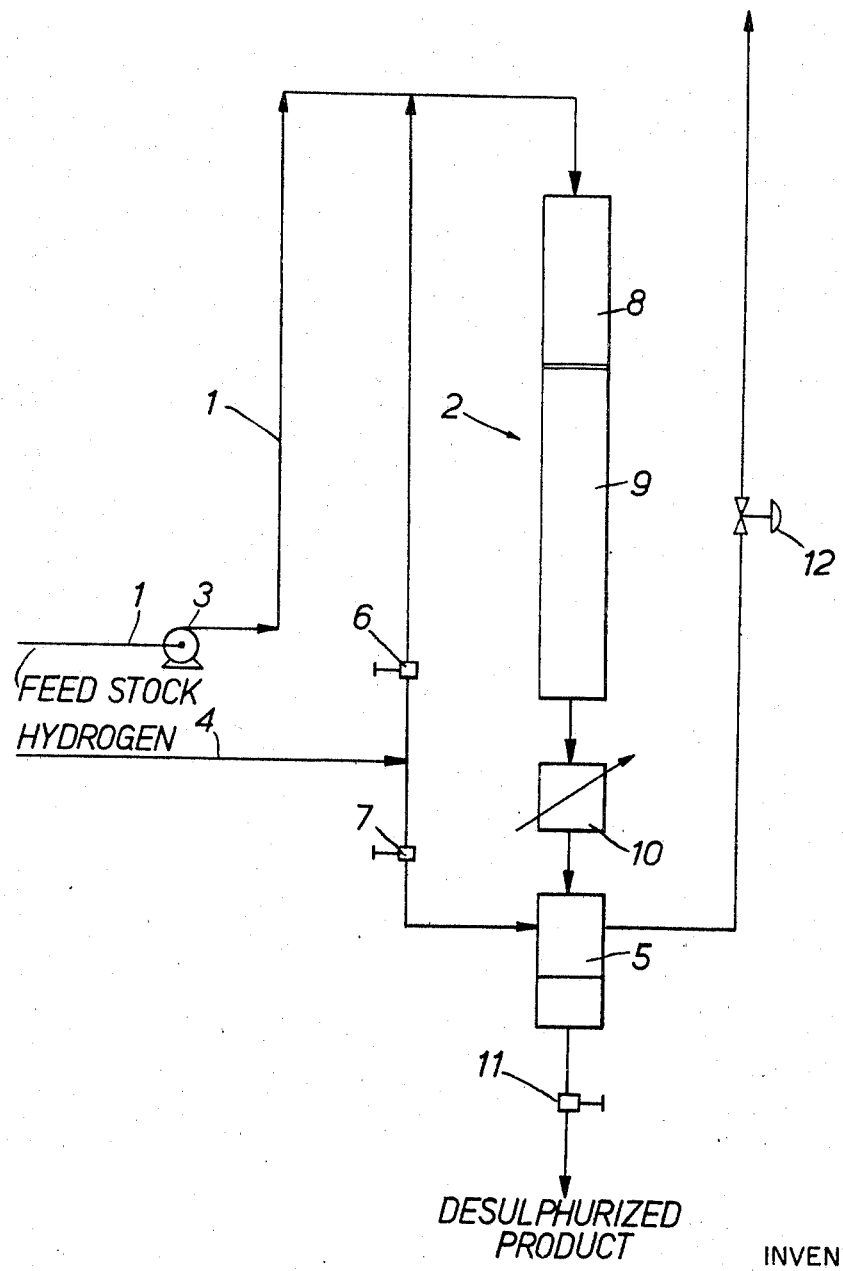

ABSTRACT OF THE DISCLOSURE

In a process in which a reactor system is operated under pressure control and a feedstock is passed in the vapour phase over a fixed bed of contact material in a reactor in the presence of an amount of hydrogen or hydrogen-containing gas regulated so that the hydrogen partial pressure is from 0.001 to 5% of the reactor pressure and in which condensible material is condensed in a condenser at a pressure not less than the reactor pressure, and material is passed from the condenser to a high pressure separator, a gas is supplied directly to the high pressure separator in an amount regulated so that the liquefied material is saturated with gas and an excess of gas is provided, the pressure thus achieved in the separator in turn pressurising the reactor.

---

The present invention relates to a process for operating a vapour phase reactor system under pressure so as to achieve its rapid pressurisation.

In a process in which hydrogen is passed with a feedstock over a catalyst it may be desirable, and sometimes essential, to restrict the amount of hydrogen present in the reactor.

For example, our co-pending U.S. patent application Ser. No. 583,740, filed Oct. 3, 1966, which is a counterpart of our U.K. patent application No. 41,940/65 discloses, inter alia, a process for the desulphurisation of aromatic feedstocks in which a low equilibrium hydrogen partial pressure is maintained in order to limit the hydrogenation of the aromatic feedstock.

The present invention is concerned with any vapour phase reaction system in which, for reasons such as that just described, it is desired to maintain a low hydrogen partial pressure relative to the total pressure. The actual pressure value in a particular case will depend on the reaction system, but will be within a range of small fractions of the total pressure, as set out below.

Because the amount of hydrogen, relative to the other reactants, must be kept low, it is not sufficient to feed hydrogen and the feedstock into the reactor until the desired plant pressure has been reached. Instead, a system of flow control is used, in which a controlled amount of hydrogen is introduced and the plant pressure is allowed to build up by preventing any gaseous material from leaving the reactor system. Such systems will normally comprise a fixed bed of contact material, a condenser and a high pressure separator, with possibly a preheater upstream of the bed of contact material. The liquefiable reactants are condensed at not less than plant pressure, and by merely closing the exit gas pressure control valve from the high pressure separator, the pressure throughout the system can be allowed to rise.

Although the danger of excessive hydrogen being present in the reactor is obviated by such a procedure, allowing the pressure to build up in this way may be a long process, and even then the required pressure may not be attainable, for example if there is not enough hydrogen present to dissolve in the liquid reactants and also provide an excess to give the required pressure.

In order to overcome this problem of a slow pressurisation of the reactor system, a technique has been developed in which a supplementary gas is fed directly to the high pressure separator.

The invention accordingly consists in a process in which a reactor system is operated under pressure control, which comprises passing a feedstock in the vapour phase over a fixed bed of contact material in a reactor in the presence of an amount of hydrogen or hydrogen-containing gas regulated so that the hydrogen partial pressure is from 0.001 to 5% of the reactor pressure, condensing condensible material at not less than the reactor pressure, passing the material from the condenser to a high pressure separator, and supplying directly to the high pressure separator a gas inert to the liquified material therein in an amount regulated so that such liquified material is saturated with gas and an excess of gas is provided, the pressure thus achieved in the separator in turn pressurising the reactor to the desired pressure.

By the term "under pressure control" we mean control by preventing any gaseous material from leaving the reactor system, i.e., by closing the exit gas pressure control valve from the high pressure separator.

The slowness with which operating pressure is achieved by allowing it to build up after closing the exit gas pressure control valve is due to the solubility of the hydrogen in the liquid effluent. The pressure builds up only when there is enough hydrogen present to saturate the liquid material in the high pressure separator and to leave an excess for pressurisation, and at low hydrogen flow rates, these is not normally enough hydrogen present for this to occur quickly.

The gas supplied to the reactor may be commercially pure hydrogen or it may be a mixed gas derived from a refinery process, such as steam reformer tail gas, also containing methane, or catalytic reformer off gas, containing, in addition to hydrogen, normally gaseous hydrocarbons selected from those having from 1 to 4 carbon atoms. Preferably the gas contains at least 50 mol percent hydrogen and preferably 70 to 99 mol percent hydrogen. If the contact material comprises elemental nickel and gas containing hydrocarbons having 2 or more carbon atoms per molecule is used conditions should be controlled so as to avoid a temperature runaway.

The gas supplied to the high pressure separator may conveniently by hydrogen, but it need not be so. Suitable gases, apart from hydrogen, are methane and nitrogen and mixtures of any of these gases, and a particularly suitable material for the purpose of the invention is steam reformer tail gas. If hydrogent or a hydrogen-containing gas is used, care should be taken to control the rate of supply of the gas to prevent the gas passing back into the reactor from the high pressure separator. It is possible that the rate of supply of gas to the separator may be higher than that to the reactor if the gas supplied to the separator is extremely insoluble in the liquid therein, but generally, and preferably, the rate of supply of gas to the high pressure separator is not greater than the rate of supply to the reactor.

The pressure achieved in the high pressure separator by the excess gas causes the reactor pressure to rise until it becomes substantially equal to the separator pressure. It is possible that the pressures will differ slightly, if, for example, there is a large pressure drop across the reactor.

The reaction conditions will naturally depend on the particular system, but the total pressure in the reactor (and hence the maximum pressure in the separator), will be within the range of from 30 to 1000 p.s.i.g and preferably from 100 to 500 p.s.i.g. The gas flow rate to the reactor may be from 5 to 100 v./v./hr. GHSV.

Although not restricted to process using nickel catalysts, The present invention is particularly suitable in such cases, where a temperature runaway may occur when the catalyst is fresh an dexcess hydrogen is present. If nickel is used it is preferably supported on a base to increase its available surface, and any of the known natural or synthetic supports may be used. Thus the support may be a refractory oxide selected from oxides of elements of Groups II to V of the Periodic Table, or a natural support such as kieselguhr, pumice, or, preferably sepiolite. The supported nickel contact material may be prepared in any of the known ways, and particularly suitable methods of preparing nickel supported on sepiolite and the activation of the prepared material are described in British Patent No. 899,652.

Again, although not confined to the treatment of hydrogenatable materials, the invention is particularly suitable in such cases and most particularly where wholly or substantially aromatic hydrocarbon containing fractions are treated in the presence of hydrogen, for example, to desulphurise them without substantial hydrogenation. It is especially suitable for use in cases where the desulphurised fraction is not subsequently hydrogenated, i.e., where it is desired to obtain a liquid desulphurised product. An example of such a process is the process described in our previously mentioned U.S. patent application Ser. No. 583,740 and U.K. patent application No. 41,940/65. In this applicaton a range of hydrogen partial pressure of from 0.1 to 10 p.s.i.a. is quoted, where the aromatic hydrocarbon is benzene. In this case the gas supplied to the separator may conveniently be the same gas as that supplied to the reactor, i.e., hydrogen or a hydrogen-containing gas and the total pressure may be from 10 to 200 p.s.i.g.

A suitable system in which to carry out the process of the present invention is shown schematically in the attached drawing.

In the drawing: 1 is the feedstock supply line, the feedstock being pumped into a reactor 2 by a pump 3. Hydrogen is supplied via line 4 to both the reactor 2 and a high pressure separator 5. If another gas were used to pressurise the separator, that part of line 4 leading to the high pressure separator would be replaced by a separate line from the source of that gas to the high pressure separator. Flow control valves 6 and 7 control the amount of hydrogen admitted to the reactor and the high pressure separator respectively. The reactor consists of a preheater 8 and a chamber 9 containing the contact material. Between the chamber outlet and the high pressure separator 5 is a condenser 10. The liquified prdouct from the high pressure separator is controlled by liquid control valve 11, and the gaseous product is led off via pressure control valve 12.

The invention is illustrated by the following example.

EXAMPLE

Benzene containing 1.3 p.p.m. wt. of sulphur, as thiophenic sulphur, was passed over a bed of 10% wt. elemental nickel on sepiolite to desulphurise it to a level of 0.1 p.p.m. wt. without hydrogenation of more than 5% vol. of the benzene.

The conditions desired in the reactor to achieve this result were

| | |
|---|---|
| Temperature °F | 430 |
| Total pressure p.s.i.g. | 100 |
| Hydrogen partial pressure at reactor outlet p.s.i.a. | 0.5 |
| Benzene flow rate v./v./hr. LHSV | 1.0 |
| Hydrogen flow rate to reactor (0.1:1 hydrogen: hydrocarbon mol ratio) GHSV v./v./hr. | 25 |

The process was started up at the designated temperature and benzene and hydrogen flow rates with the reactor at atmospheric pressure and the pressure control valve 12 closed. By keeping valve 7 shut no hydrogen was fed to the high pressure separator 5 directly. After the required liquid level had been established in the high pressure separator liquid benzene was withdrawn through control valve 11 such that the liquid level in the separator was maintained constant.

Under these conditons the pressure rose gradually to 100 p.s.i.g. over a period of 12 hours.

In order to reduce that time to reach a suitable operating pressure a second run was started up in the same way and under the same conditions except that in addition, hydrogen was fed to the separator 5 at a rate of 10 v./v./hr. (based on the amount of catalyst in the reactor). Under these conditions the pressure in the system reached 200 p.s.i.g. in half an hour. There was no increase of hydrogenation in the reactor indicating that the additional hydrogen fed to the separator had not passed back into the reactor.

What we claim is:

1. A process in which a reactor system is operated under pressure control, which comprises passing a feedstock in the vapour phase over a fixed bed of contact material in a reactor in the presence of an amount of hydrogen or hydrogen-containing gas regulated so that the hydrogen partial pressure is from 0.001 to 5% of the reactor pressure, condensing condensible material at not less than the reactor pressure, passing the material from the condenser to a high pressure separator, and supplying directly to the high pressure separator a gas inert to the liquified material therein in an amount regulated so that such liquified material is saturated with gas and an excess of gas is provided, the pressure thus achieved in the separator in turn pressurising the reactor to the desired pressure.

2. A process as claimed in claim 1, in which the reactor pressure is from 30 to 1000 p.s.i.g.

3. A process as claimed in claim 2, in which the reactor pressure is from 100 to 500 p.s.i.g.

4. A process as claimed in claim 1, in which the gas flow rate to the reactor is from 5 to 100 v./v./hr. GHSV.

5. A process as claimed in claim 1, in which the reactor pressure is substantially equal to the pressure in the high pressure separator.

6. A process as claimed in claim 1 in which the hydrogen-containing gas present in the reactor contains at least 50 mol percent hydrogen and any of hydrocarbons having from 1 to 4 carbon atoms.

7. A process as claimed in claim 1, in which the gas supplied to the high pressure separator is selected from hydrogen, hydrocarbons having from 1 to 4 carbon atoms, nitrogen, and mixtures of any of these gases.

8. A process as claimed in claim 1, in which the hydrogen containing gas present in the reactor is a tail gas derived from the steam cracking of petroleum feedstocks, and containing hydrogen and methane, or catalytic reformer off-gas, containing hydrogen and hydrocarbons selected from those having from 1 to 4 carbon atoms.

9. A process as claimed in claim 1 in which the contact material is nickel supported on a refractory oxide selected from oxides of elements of Groups II to V of the Periodic Table, or nickel supported on kieselguhr, pumice, or sepiolite.

10. A process as claimed in claim 1 in which the feedstock is a wholly or substantially aromatic hydrocarbon-containing fraction.

11. A process as claimed in claim 10, in which the gas supplied to the high pressure separator is the same as that supplied to the reactor.

12. A process as claimed in claim 10, in which the feedstock is benzene which is contacted with nickel on sepiolite in the presence of hydrogen at a partial pressure of from 0.01 to 10 p.s.i.a., hydrogen being supplied to the high pressure separator so as to achieve a reactor pressure of from 10 to 200 p.s.i.g.

13. A process as claimed in claim 1 in which the gas supplied to the separator is a tail gas derived from the steam cracking of petroleum feedstocks, and containing hydrogen and methane, or catalytic reformer off-gas, containing hydrogen and hydrocarbons selected from those having from 1 to 4 carbon atoms.

References Cited

UNITED STATES PATENTS

| | | | |
|---|---|---|---|
| 3,202,723 | 8/1965 | Thonon | 260—667 |
| 3,254,134 | 5/1966 | Smith et al. | 260—667 |
| 2,300,877 | 11/1942 | Drennan | 208—244 |
| 3,304,338 | 2/1967 | Parish | 208—143 |
| 3,309,307 | 3/1967 | Bryant | 260—667 |
| 3,341,613 | 9/1967 | Hann | 260—667 |
| 3,405,190 | 10/1968 | Logemann et al. | 208—143 |

DELBERT E. GANTZ, Primary Examiner

CURTIS R. DAVIS, Assistant Examiner

U.S. Cl. X.R.

260—667; 208—143, 217

PO-1050
(5/69)

UNITED STATES PATENT OFFICE
CERTIFICATE OF CORRECTION

Patent No. 3,484,501     Dated December 16, 1969

Inventor(s) John Winsor and John Carruthers

It is certified that error appears in the above-identified patent and that said Letters Patent are hereby corrected as shown below:

Column 2, line 38 "these" should read --there--;

Column 2, line 53 "by" should read --be--;

Column 3, line 4 "difler" should read --differ--;

Column 3, line 12 "process" should read --processes--;

Column 3, line 13 "The" should read --the--;

Column 3, line 15 "an dexcess" should read --and excess--;

Column 3, line 61 "prdouct" should read --product--; and

Column 4, line 6 "GHSV hydrocarbon mol ratio)_ _ _ _v./v./hr _ ___ 25" should read --hydrocarbon mol ratio) _ _ _ _ v./v./hr. GHSV _ _ _ _ 25--.

SIGNED AND
SEALED

JUN 23 1970

(SEAL)
Attest:

Edward M. Fletcher, Jr.
Attesting Officer

WILLIAM E. SCHUYLER, JR.
Commissioner of Patents